(12) United States Patent
Demirci et al.

(10) Patent No.: US 9,771,002 B2
(45) Date of Patent: Sep. 26, 2017

(54) LOCKING UNIT FOR A VEHICLE SEAT, AND VEHICLE SEAT

(71) Applicant: JOHNSON CONTROLS GMBH, Burscheid (DE)

(72) Inventors: Oezkan Demirci, Bochum (DE); Andreas Vedder, Haan (DE); Igor Gordeenko, Frechen (DE); Patrick Handl, Koeln (DE); Uwe Moeller, Solingen (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 14/917,406

(22) PCT Filed: Aug. 29, 2014

(86) PCT No.: PCT/EP2014/068412
§ 371 (c)(1),
(2) Date: Mar. 8, 2016

(87) PCT Pub. No.: WO2015/036263
PCT Pub. Date: Mar. 19, 2015

(65) Prior Publication Data
US 2016/0221473 A1    Aug. 4, 2016

(30) Foreign Application Priority Data

Sep. 10, 2013  (DE) .......... 10 2013 218 110
Dec. 13, 2013  (DE) .......... 10 2013 225 858

(51) Int. Cl.
*B60N 2/36* (2006.01)
*B60N 2/015* (2006.01)
(Continued)

(52) U.S. Cl.
CPC ......... *B60N 2/01583* (2013.01); *B60N 2/366* (2013.01); *B60N 2/682* (2013.01); *E05B 79/04* (2013.01); *E05B 79/08* (2013.01)

(58) Field of Classification Search
CPC ..... B60N 2/01583; B60N 2/366; B60N 2/682
(Continued)

(56) References Cited

U.S. PATENT DOCUMENTS 3,746,389 A * 7/1973 Fourrey ............... B60N 2/3013
                                                   297/378.13 X
4,909,571 A * 3/1990 Vidwans .............. B60N 2/433
                                                   297/378.13 X
(Continued)

FOREIGN PATENT DOCUMENTS

DE   10 2008 051832 A1   4/2010
WO   2012/117958 A1      9/2012

*Primary Examiner* — Rodney B White
(74) *Attorney, Agent, or Firm* — McGlew and Tuttle, P.C.

(57) ABSTRACT

A locking unit (10) for a vehicle seat (1) includes a housing with a side plate (16) which has at least one first mounting aperture (17), and/or with a cover plate (18) which has at least one second mounting aperture (19), and at least one mounting stud (51, 52). The first mounting aperture (17) and/or the second mounting aperture (19) are designed so that the mounting stud (51, 52) can be placed in at least two different positions in the first mounting aperture (17) and/or in the second mounting aperture (19).

19 Claims, 4 Drawing Sheets

(51) Int. Cl.
*B60N 2/68* (2006.01)
*E05B 79/04* (2014.01)
*E05B 79/08* (2014.01)

(58) Field of Classification Search
USPC .................................................. 297/378.13
See application file for complete search history.

(56) References Cited

U.S. PATENT DOCUMENTS

| | | | |
|---|---|---|---|
| 8,727,443 B2 * | 5/2014 | Vedder .................... | B60N 2/366 297/378.13 X |
| 8,950,810 B2 * | 2/2015 | Dryburgh ........... | B60N 2/01583 297/378.13 X |
| 9,039,048 B2 * | 5/2015 | Muller ............... | B60N 2/01583 292/216 |
| 9,156,383 B2 * | 10/2015 | Handl ..................... | B60N 2/366 |
| 9,199,554 B2 * | 12/2015 | Muller .................... | B60N 2/01583 |
| 9,376,078 B1 * | 6/2016 | Li ............................ | B60N 2/20 |
| 2004/0262973 A1 * | 12/2004 | Reubeuze .......... | B60N 2/01541 297/378.13 |
| 2010/0237673 A1 * | 9/2010 | Lindsay ............... | B60N 2/2245 297/378.13 |
| 2011/0006576 A1 * | 1/2011 | Muller ............... | B60N 2/01583 297/378.13 |
| 2016/0152159 A1 * | 6/2016 | Gordeenko ............ | B60N 2/366 297/378.13 |

\* cited by examiner

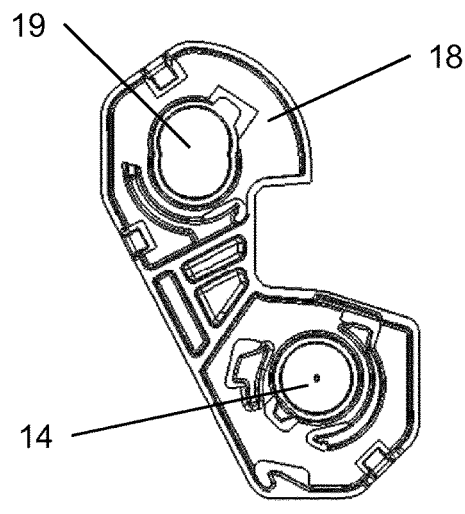
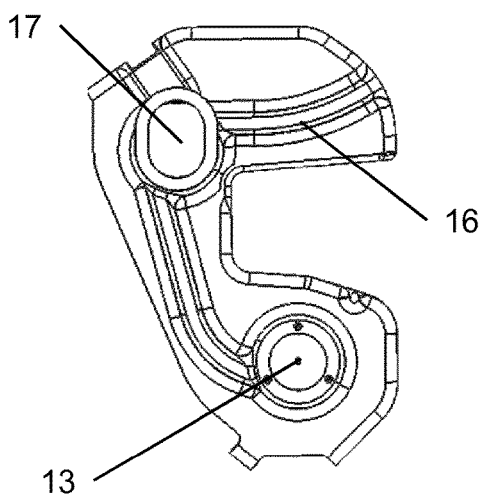
Fig. 7              Fig. 8
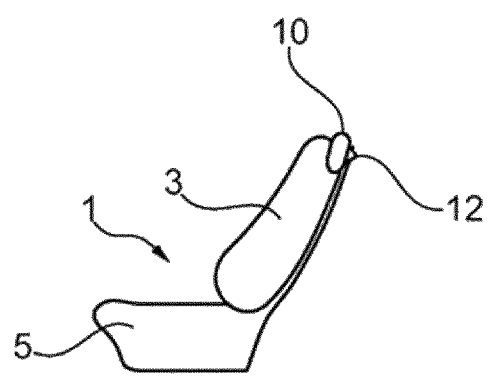
Fig. 9

LOCKING UNIT FOR A VEHICLE SEAT, AND VEHICLE SEAT

CROSS REFERENCE TO RELATED APPLICATIONS

This application is a United States National Phase Application of International Application PCT/EP2014/068412 filed Aug. 29, 2014 and claims the benefit of priority under 35 U.S.C. §119 of German Patent Applications 10 2013 218 110.8 filed Sep. 10, 2013 and 10 2013 225 858.5 filed Dec. 13, 2013 the entire contents of which are incorporated herein by reference.

FIELD OF THE INVENTION

The invention relates to a locking unit for a vehicle seat having a housing having a side plate which has at least a first bearing opening and/or having a covering plate which has at least a second bearing opening and at least one bearing pin. The invention also relates to a vehicle seat having such a locking unit.

BACKGROUND OF THE INVENTION

DE 10 2008 051 832 A1 discloses a generic locking unit for a vehicle seat. Such a locking unit comprises a rotary latch which is pivotably supported about a pivot axis for locking with a locking pin. A catch detent which is pivotably supported about another pivot axis secures the rotary latch in the locked state. A pivotably supported clamping element which is referred to as a tolerance compensation detent applies a closing torque to the rotary latch and in this manner eliminates play present between the rotary latch and the locking pin.

The catch detent and the clamping element can be pivoted about the same axis and are arranged to be axially offset beside each other on a bearing pin and cooperate with the rotary latch. The rotary latch is supported on another bearing pin. The two bearing pins are constructed to be approximately hollow-cylindrical and are arranged to be offset parallel with each other. The center axes of the bearing pins are in alignment with the said pivot axes. The bearing pins are secured to lateral portions of a housing of the locking unit.

Using screws which protrude through bearing holes of the lateral portions and the bearing pins and which are screwed into corresponding securing holes in the structure of the vehicle seat, the locking unit is secured to the vehicle seat. The center axes of the screws are in alignment with the center axes of the bearing pins and with the center axes of the securing holes.

The spacing of the center axes of the securing holes with respect to each other is referred to as a hole interval dimension. So that the locking unit can be secured to the vehicle seat, the spacing of the center axes of the bearing pins with respect to each other must correspond to the hole interval dimension in the structure of the vehicle seat. If the locking unit is intended to be secured to another vehicle seat with a different hole interval dimension, the locking unit is intended to be adapted to this hole interval dimension.

SUMMARY OF THE INVENTION

An object of the invention is to improve a locking unit of the type mentioned in the introduction, in particular to enable an adaptation to different hole interval dimensions.

A generic locking unit for a vehicle seat comprises a housing having a side plate which has at least a first bearing opening and/or having at least one covering plate which has at least a second bearing opening and at least one bearing pin.

According to the invention, there is provision in this instance for the first bearing opening and/or the second bearing opening to be constructed in such a manner that the bearing pin can be inserted in at least two different positions in the first bearing opening and/or in the second bearing opening.

By inserting the bearing pin in different positions in the bearing openings, it is possible to achieve in a relatively simple manner an adaptation of the locking unit to different hole interval dimensions. In this instance, each position in which the bearing pin can be inserted into the bearing openings corresponds to a hole interval dimension. Consequently, locking units with different hole interval dimensions with substantially identical components can be produced. The complexity for production and storage of a plurality of different components for adaptation of the locking unit to different hole interval dimensions is consequently reduced.

According to an advantageous embodiment of the invention, the first bearing opening and/or the second bearing opening are constructed in the form of an elongate hole. The bearing pin can thereby be moved within the elongate hole. Consequently, by displacing the bearing pin within the elongate hole, a stepless adaptation of the locking unit to any hole interval dimensions between a maximum hole interval dimension and a minimum hole interval dimension is possible.

According to another advantageous embodiment of the invention, the first bearing opening and/or the second bearing opening are constructed as holes which merge into each other. In this instance, each hole corresponds to a discrete hole interval dimension. The bearing pin can, during assembly of the locking unit, be inserted into the desired hole which corresponds to the desired hole interval dimension. Consequently, a stepped adaptation of the locking unit to a plurality of hole interval dimensions is possible.

Preferably, the side plate further has at least a first bearing hole having a circular cross-section and/or the covering plate further has at least a second bearing hole having a circular cross-section.

Preferably, the locking unit has two bearing pins, wherein a first bearing pin is inserted in the first bearing opening and/or in the second bearing opening, and wherein a second bearing pin is inserted in the first bearing hole and/or in the second bearing hole.

Advantageously, a rotary latch for locking with a locking pin is pivotably supported on the first bearing pin which is inserted in the first bearing opening and/or in the second bearing opening.

Advantageously, a catch detent, which secures the rotary latch in the locked state, and/or a clamping element which in the locked state eliminates play between the rotary latch and the locking pin, are pivotably supported on the second bearing pin which is inserted in the first bearing hole and/or in the second bearing hole.

According to an advantageous development of the invention, the catch detent has at least two securing holes for securing an actuation means. By securing the actuation means in the corresponding securing hole, an adaptation of the actuation force to the adjusted hole interval dimension is possible.

According to another advantageous development of the invention, the clamping element has at least two suspension holes for securing a spring, which pretensions the clamping element in the direction toward the rotary latch. By securing the spring in the corresponding suspension hole, an adaptation of the clamping force to the adjusted hole interval dimension is possible.

The object is also achieved by a vehicle seat which comprises at least one locking unit according to the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 7 is an illustration of a covering plate of a locking unit according to the invention;

FIG. 8 is an illustration of a side plate of a locking unit according to the invention; and FIG. 9 is a schematic illustration of a vehicle seat.

DESCRIPTION OF THE PREFERRED EMBODIMENTS

Figure 1:
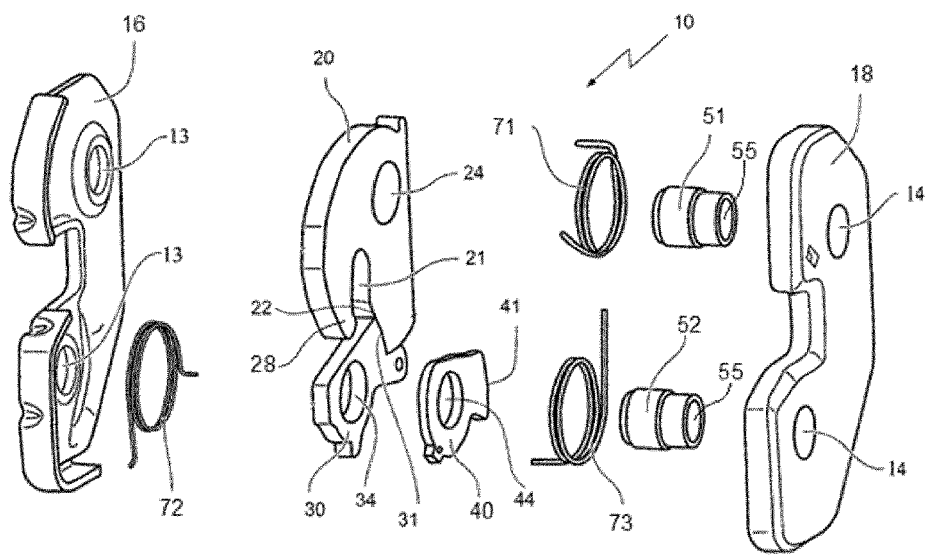
FIG. 1 is an exploded view of a generic locking unit according to the prior art.

In a motor vehicle, a locking unit 10 is provided for connecting a backrest 3 of a vehicle seat 1, in particular a rear seat, to a vehicle structure. The backrest 3 is in this instance fitted to a seat member 5 so as to be able to be pivoted from a position for use into a non-use position.

However, the locking unit 10 can also be used at other locations, for example, for securing the seat member 5 of the vehicle seat 1 to the base structure of the motor vehicle or in a door lock.

The arrangement of the vehicle seat 1 inside the vehicle and the conventional travel direction thereof define the directional indications used below. In this instance, a direction which is orientated perpendicularly relative to the ground is referred to below as the vertical direction and a direction perpendicular relative to the vertical direction and perpendicular relative to the travel direction is referred to below as the transverse direction.

A locking unit 10 according to the prior art has a lock housing which comprises a side plate 16 and a covering plate 18. The base faces of the side plate 16 and the covering plate 18 are constructed in this instance in a flat manner and arranged in a plane which is defined by the travel direction and the vertical direction, that is to say, perpendicularly relative to the transverse direction. The side plate 16 comprises two, in this instance round, first bearing holes 13. The covering plate 18 comprises two, in this instance round, second bearing holes 14.

The side plate 16 and the covering plate 18 form a receiving opening which opens in the direction of a locking pin 12 in order to receive it for locking. In this instance, the locking unit 10 is secured to the backrest 3 and the locking pin 12 is secured to the vehicle structure. It is also conceivable for the locking unit 10 to be secured to the vehicle structure and the locking pin 12 to be secured to the backrest 3. The portion of the locking pin 12 intended to be received by the receiving opening generally extends horizontally in a transverse direction.

A rotary latch 20 is pivotably supported on a first bearing pin 51 which in turn is secured to the side plate 16 and to the covering plate 18. To this end, the rotary latch 20 has a rotary latch hole 24 through which the first bearing pin 51 extends. The rotary latch 20 further has a hooked aperture 21 for cooperation with the locking pin 12. Using a first spring 71, the rotary latch 20 is pretensioned in the opening direction.

The rotary latch 20 has an operating face 22 which partially laterally delimits the hooked aperture 21. In the locked state, the operating face 22 faces approximately in the direction of a second bearing pin 52 which is arranged parallel with the first bearing pin 51 and consequently also extends in the transverse direction. The operating face 22 is constructed in a planar manner in this instance, but may, for example, also be curved in a circular-arc-like manner and constructed so as to be concave.

At the side of the hooked aperture 21 facing away from the rotary latch hole 24 and in a state opposite the operating face 22, the hooked aperture 21 is laterally delimited by a protrusion 28 of the rotary latch 20. The rotary latch 20 has a base member which is delimited in an axial direction by a flat base face in each case. The width of the operating face 22 corresponds to the thickness of the base member of the rotary latch 20, that is to say, the expansion of the base member in an axial direction.

The first bearing pin 51 is inserted in a first bearing hole 13 of the side plate 16 and in a second bearing hole 14 of the covering plate 18 and protrudes in a perpendicular manner from the base faces of the side plate 16 and the covering plate 18. The first bearing pin 51 consequently extends horizontally in a transverse direction. The first bearing pin 51 has a through-opening 55 with a substantially constant inner diameter.

The second bearing pin 52 is also inserted into a first bearing hole 13 of the side plate 16 and into a second bearing hole 14 of the covering plate 18 and protrudes from the base faces of the side plate 16 and the covering plate 18 in a perpendicular manner. The second bearing pin 52 consequently also extends horizontally in a transverse direction. The second bearing pin 52 has, in the same manner as the first bearing pin 51, a through-opening 55 with a substantially constant inner diameter.

The direction in which the bearing pins 51, 52 extend is referred to below as the axial direction. In this instance, in the described installation situation of the locking unit 10 on the backrest 3 of the vehicle seat 1, the axial direction extends parallel with the transverse direction.

The bearing pins 51, 52 are constructed to be substantially rotationally symmetrical relative to a bearing axis 56 which extends in an axial direction. The bearing axes 56 of the bearing pins 51, 52 are in alignment with the center axes of the respective through-openings 55.

The through-openings 55 of the bearing pins 51, 52 serve to receive a securing means, for example, a screw, by means of which the locking unit 10 is secured during assembly on the backrest 3 or on another structural portion of the vehicle seat 1 or the vehicle. To this end, the screws are screwed into securing holes in the structural portion. The spacing of the center axes of the securing holes with respect to each other defines a hole interval dimension of the structural portion.

In this instance, the first bearing pin 51 and the second bearing pin 52 comprise a metal, the side plate 16 also in this instance comprises a metal and the covering plate 18 in this instance comprises a plastics material.

A clamping element 40 is pivotably supported on the second bearing pin 52. To this end, the clamping element 40 has an, in this instance circular, clamping element hole 44, through which the second bearing pin 52 extends. By means of a third spring 73, the clamping element 40 is pretensioned with respect to the rotary latch 20.

In the locked state, when the hooked aperture 21 of the rotary latch 20 receives the locking pin 12, the clamping element 40 applies, as a result of the pretensioning by the third spring 73, as a securing element a closing torque to the rotary latch 20. To this end, the clamping element 40 has a clamping face 41 which is curved in an eccentric manner with respect to the second bearing pin 52 and which is located in non-self-locking contact with the operating face 22 of the rotary latch 20. The clamping face 41 is in this instance curved in a circular-arc-like manner and constructed in a convex manner.

A catch detent 30 is arranged on the second bearing pin 52 axially beside the clamping element 40 and also pivotably supported on the second bearing pin 52, that is to say, in alignment with the clamping element 40. To this end, the catch detent 30 has an, in this instance circular, catch detent hole 34, through which the second bearing pin 52 extends. Using a second spring 72, the catch detent 30 is pretensioned toward the rotary latch 20.

The catch detent 30 is in this instance arranged beside the side plate 16 and the clamping element 40 is in this instance arranged beside the covering plate 18. The catch detent 30 and the clamping element 40 are coupled for entrainment with free travel, for example, by means of a tongue and groove joint or by means of an axially protruding carrier.

The catch detent 30 has a catch face 31 which is located adjacent to the clamping face 41 of the clamping element 40. In the locked state, the catch face 31 is positioned with spacing from the operating face 22 of the rotary latch 20. The catch face 31 is curved in a circular-arc-like manner (having a circular arc) in this instance and constructed in a convex manner, but may also be planar.

In the event of a crash, when the rotary latch 20 may be subjected to an opening torque and presses away the clamping element 40, the catch face 31 moves into abutment with the operating face 22 of the rotary latch 20, without an opening torque being able to be transmitted. The catch detent 30 thus serves to support the rotary latch 20 in the event of a crash and consequently prevents, as an additional securing element, the rotary latch 20 from opening.

The width of the operating face 22, which corresponds to the thickness of the base member of the rotary latch 20, also substantially corresponds to the sum of the thickness of the catch detent 30 and the thickness of the clamping element 40. The rotary latch 20 therefore has substantially the same material thickness as the catch detent 30 and the clamping element 40 together.

In the locked state of the locking unit 10, the locking pin 12 is located in the receiving opening formed by the side plate 16 and the covering plate 18 and in the hooked aperture 21 of the closed rotary latch 20. The clamping element 40 secures the rotary latch 20 by means of cooperation of the clamping face 41 with the operating face 22. The catch face 31 of the catch detent 30 is slightly spaced apart from the operating face 22 of the rotary latch 20.

In order to open the locking unit 10, the catch detent 30 is pivoted away from the rotary latch 20, whereby the catch face 31 of the catch detent 30 is moved further away from the operating face 22 of the rotary latch 20. The catch detent 30 carries the clamping element 40 as a result of the entrained coupling so that the rotary latch 20 is no longer secured.

As a result of the pretensioning as a result of the first spring 71, the rotary latch 20 opens and therefore pivots in an opening direction. Alternatively or additionally to the pretensioning by the first spring 71, the rotary latch 20 can also be carried for opening by the catch detent 30 or the clamping element 40.

As a result of the pivoting movement of the rotary latch 20, the hooked aperture 21 is retracted from the receiving opening formed by the side plate 16 and the covering plate 18 and releases the locking pin 12, which moves away from the locking unit 10 counter to the inward pivoting direction. If the locking pin 12 has left the hooked aperture 21, the locking unit 10 is in the unlocked state.

If, in this unlocked state, the locking pin 12 reaches the receiving opening formed by the side plate 16 and the covering plate 18 again and moves into abutment with the edge of the hooked aperture 21, the locking pin 12 presses the rotary latch 20 into the closed position thereof. The clamping element 40 moves as a result of its pretensioning by the third spring 73 along the operating face 22. In a state carried by the clamping element 40 or as a result of the pretensioning by the second spring 72, the catch detent 30 pivots toward the rotary latch 20, wherein the catch face 31 of the operating face 22 moves closer to the rotary latch 20. Afterwards, the locking unit 10 is located in the locked state again.

Figure 2:
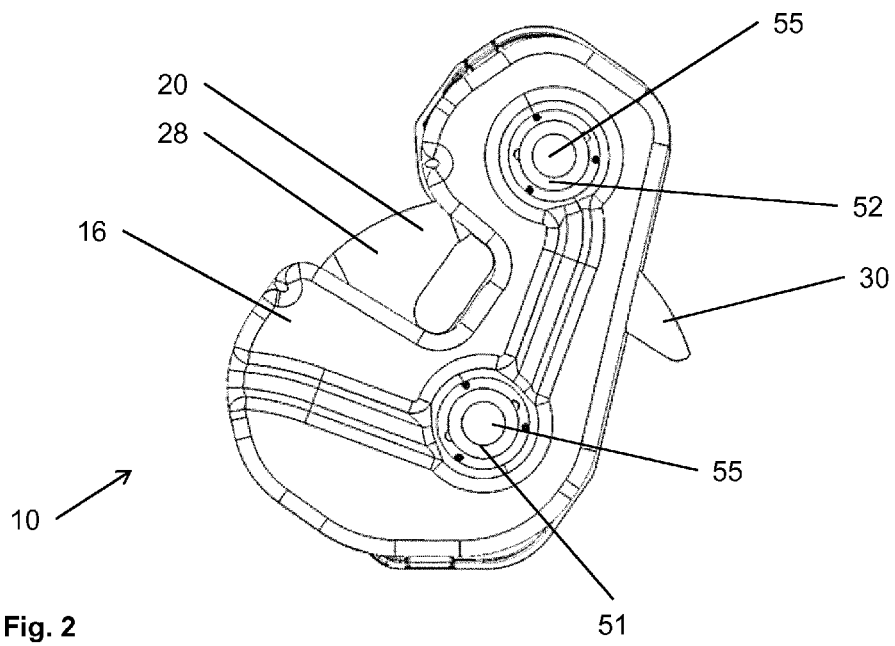
FIG. 2 is a side view of a generic locking unit according to the prior art.

In the locking unit 10 illustrated in FIGS. 1 and 2 according to the prior art, the side plate 16 comprises two identically constructed, circular first bearing holes 13. The covering plate 18 also comprises two identically constructed circular second bearing holes 14.

In the locking unit 10 according to the invention, the side plate 16 has a circular first bearing hole 13 and a first bearing opening 17 which is constructed in the form of an elongate hole. The covering plate 18 has a circular second bearing hole 14 and a second bearing opening 19 which is constructed in the form of an elongate hole. The side plate 16 and the covering plate 18 are components of a lock housing of the locking unit 10.

The first bearing hole 13 and the second bearing hole 14 serve to receive the second bearing pin 52 on which the catch detent 30 and the clamping element 40 are supported.

The first bearing opening 17 and the second bearing opening 19 serve to receive the first bearing pin 51, on which the rotary latch 20 is supported.

The spacing of the bearing axis 56 of the first bearing pin 51 with respect to the bearing axis 56 of the second bearing pin 52 corresponds to the hole interval dimension of the structural component.

As a result of a displacement of the first bearing pin 51 in the first bearing opening 17 and in the second bearing opening 19 relative to the side plate 16 and to the covering plate 18, there is produced a displacement of the first bearing pin 51 relative to the second bearing pin 52. A displacement of the bearing axes 56 of the bearing pins 51, 52 relative to each other is thereby carried out and the spacing of the two bearing axes 56 relative to each other thereby changes.

As a result of a displacement of the first bearing pin 51 in the first bearing opening 17 and in the second bearing opening 19 relative to the side plate 16 and the covering plate 18, an adaptation of the locking unit 10 to different hole interval dimensions of a plurality of structural components is consequently possible.

Figure 3:
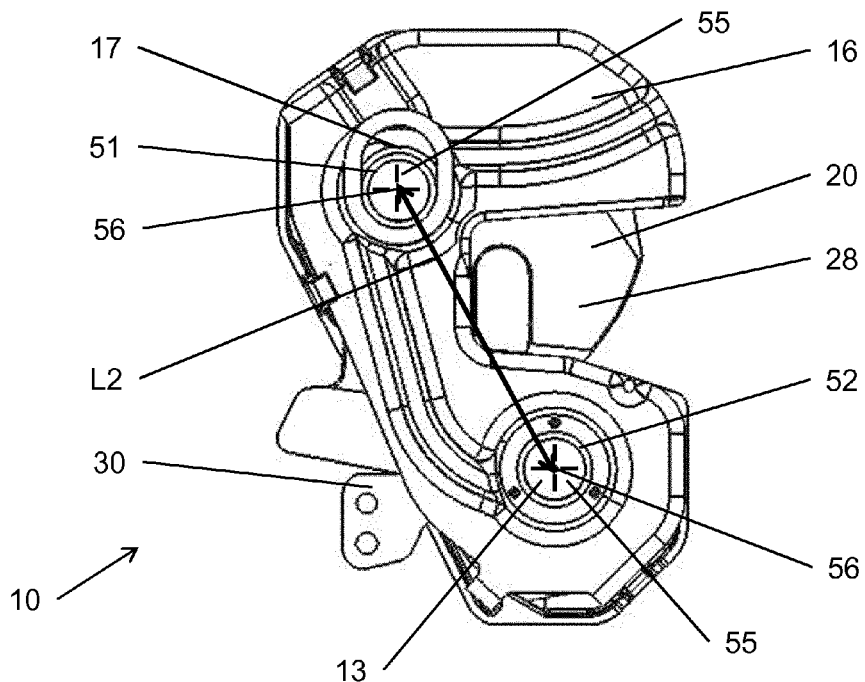
FIG. 3 is a side view of a locking unit according to the invention with adaptation to a minimum hole interval dimension.
Figure 4:
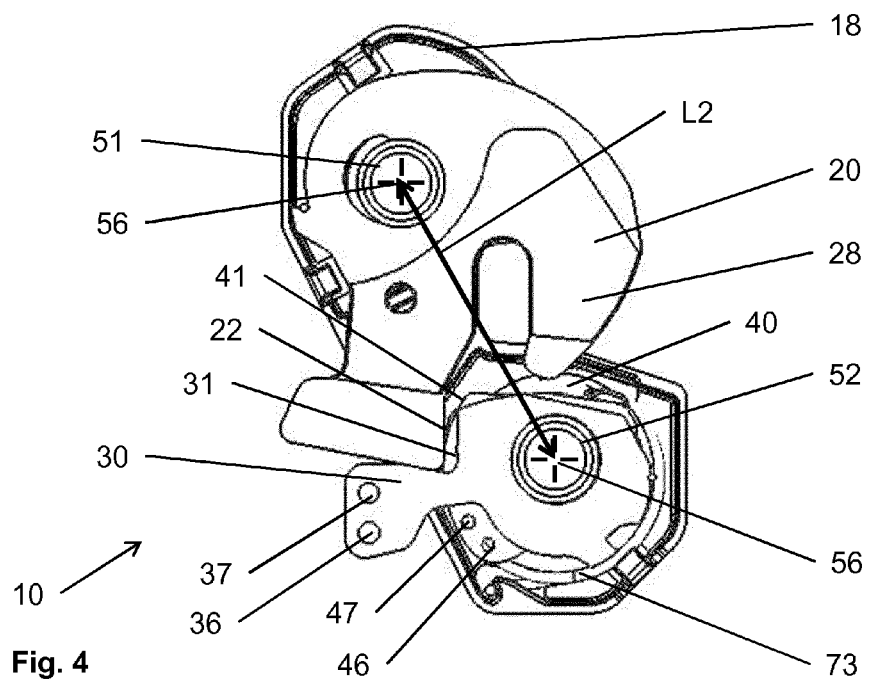
FIG. 4 is an illustration according to FIG. 3 without a side plate.

In the illustration shown in FIGS. 3 and 4, the first bearing pin 51 is arranged in such a manner that the spacing of the bearing axes 56 of the bearing pins 51, 52 with respect to each other is minimal Consequently, the locking unit 10 is adapted to a minimum hole interval dimension L2.

Figure 5:
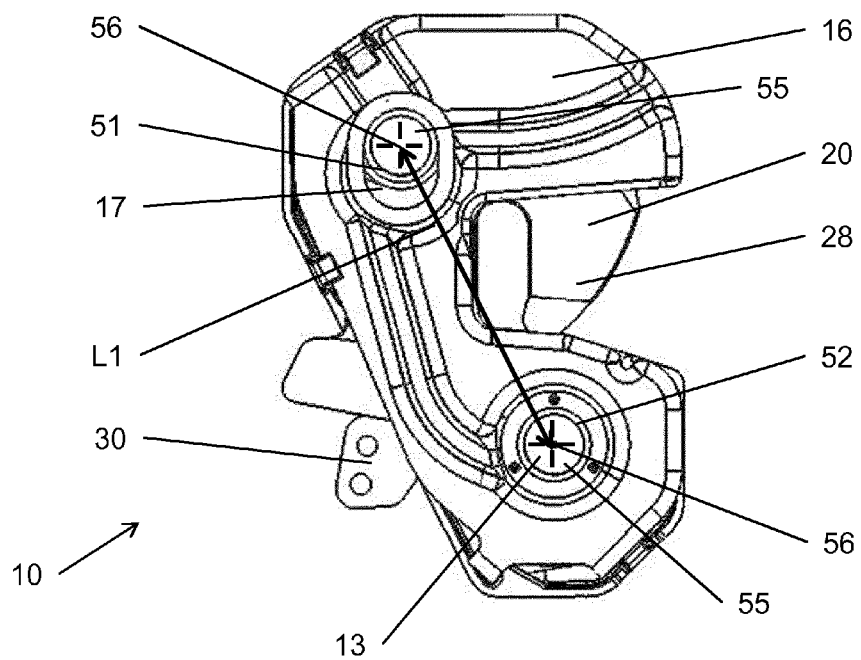
FIG. 5 is a side view of a locking unit according to the invention with adaptation to a maximum hole interval dimension.
Figure 6:
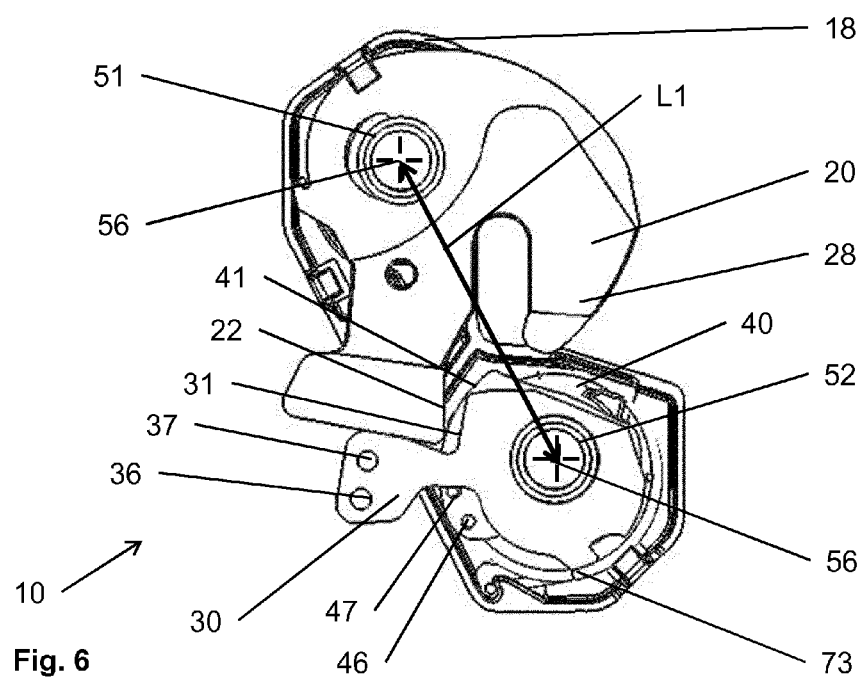
FIG. 6 is an illustration according to FIG. 5 without a side plate.

In the illustration shown in FIG. 5 and FIG. 6, the first bearing pin 51 is arranged in such a manner that the spacing of the bearing axes 56 of the bearing pins 51, 52 with respect to each other is at a maximum. Consequently, the locking unit 10 is adapted to a maximum hole interval dimension L1.

The clamping element 40 is constructed in such a manner that the clamping face 41 is, regardless of the position of the first bearing pin 51 in the bearing openings 17, 19, when the locking unit 10 is locked, always in non-self-locking contact with the operating face 22 of the rotary latch 20. The clamping element 40 consequently applies, when the locking device 10 is locked, regardless of the adjusted hole interval dimension, a closing torque to the rotary latch 20.

The catch detent 30 is constructed in such a manner that the catch face 31, regardless of the position of the first bearing pin 51 in the bearing openings 17, 19, moves in the event of a crash into abutment with the operating face 22 of the rotary latch 20. The catch detent 30, regardless of the adjusted hole interval dimension, thus always serves to support the rotary latch 20 in the event of a crash and consequently prevents the rotary latch 20 from opening.

In this instance, the catch detent 30 has two securing holes 36, 37 for securing an actuation means which is not illustrated. The securing holes 36, 37 are located in a radial direction with different spacings from the bearing axis 56 of the second bearing pin 52 and are arranged offset with respect to each other in the peripheral direction. The first securing hole 36 is in this instance further away in a radial direction from the bearing axis of the second bearing pin than the second securing hole 37.

If the locking unit 10 is adapted to a maximum hole interval dimension L1, the actuation means is intended to be secured to the first securing hole 36. If the locking unit 10 is adapted to a minimum hole interval dimension L2, the actuation means is intended to be secured to the second securing hole 37.

In this instance, the clamping element 40 has two suspension holes 46, 47 for receiving the third spring 73. The suspension holes 46, 47 are located in a radial direction approximately with the same spacing from the bearing axis 56 of the second bearing pin 52 and are arranged offset with respect to each other in a peripheral direction.

If the locking unit 10 is adapted to a maximum hole interval dimension L1, the third spring 73 is intended to be secured to the first suspension hole 46. If the locking unit 10 is adapted to a minimum hole interval dimension L2, the third spring 73 is intended to be secured to the second suspension hole 47.

As a result of the provision of a plurality of securing holes 36, 37 and a plurality of suspension holes 46, 47, an adaptation of the actuation forces and clamping forces of the locking unit 10 to different hole interval dimensions is possible.

As a result of a displacement of the first bearing pin 51 relative to the second bearing pin 52, a stepless adaptation of the locking unit 10 to any hole interval dimensions between the maximum hole interval dimension L1 and the minimum hole interval dimension L2 is consequently possible. A definitive fixing of the hole interval dimension is carried out when the locking unit is secured to the backrest 3.

Alternatively, it is also conceivable for the first bearing opening 17 in the side plate 16 and/or the second bearing opening 19 in the covering plate 18 not to be constructed as elongate holes, but instead as two or more eccentrically arranged holes, preferably merging into each other. In this instance, not a stepless, but instead a stepped adaptation is possible with respect to two or more hole interval dimensions by inserting the first bearing pin 51 into the respective hole. The number of holes corresponds in this instance to the number of adjustable hole interval dimensions.

While specific embodiments of the invention have been shown and described in detail to illustrate the application of the principles of the invention, it will be understood that the invention may be embodied otherwise without departing from such principles.

The invention claimed is:

1. A locking unit for a vehicle seat, the locking unit comprising:
   a housing comprising a side plate, or a cover plate or both a side plate and a cover plate, the housing having a bearing opening; and
   at least one bearing pin, wherein the bearing opening defines at least two insertion positions in such a manner that the bearing pin can be inserted in the at least two different positions in the bearing opening, wherein the housing comprising the side plate with a first bearing opening and a side plate through hole and the cover plate with a second bearing opening and a cover plate through hole and the housing bearing opening comprises the first bearing opening and the second bearing opening the side plate through hole being located at a spaced location from the first bearing opening, the cover plate through hole being located at a spaced location from the second bearing opening, the housing comprising a housing through hole, the housing through hole comprising the side plate through hole and the cover plate through hole, whereby the housing is adapted to connect with different hole interval dimensions of the vehicle seat by inserting the bearing pin in different positions in the housing bearing opening, the first bearing opening or the second bearing opening or both the first bearing opening and the second bearing opening being constructed as holes which merge into each other.

2. The locking unit as claimed in claim 1, wherein the bearing opening is constructed in the form of an elongate hole.

3. A locking unit for a vehicle seat, the locking unit comprising:
   a housing comprising a side plate, or a cover plate or both a side plate and a cover plate, the housing having a bearing opening; and
   at least one bearing pin, wherein the bearing opening defines at least two insertion positions in such a manner that the bearing pin can be inserted in the at least two different positions in the bearing opening, wherein the side plate has at least a first bearing hole having a circular cross-section located at a spaced location from the bearing opening or the covering plate has at least a second bearing hole having a circular cross-section located at a spaced location from the bearing opening or both the side plate has at least a first bearing hole having a circular cross-section located at a spaced location from the bearing opening and the covering plate has at least a second bearing hole having a circular cross-section located at a spaced location from the bearing opening, whereby the housing is adapted to connect with different hole interval dimensions of a vehicle seat by inserting the bearing pin in different positions in the housing bearing opening.

4. The locking unit as claimed in claim 3, further comprising another bearing pin wherein:
the housing comprising the side plate with a first bearing opening and the cover plate with a second bearing opening and the housing bearing opening comprises the first bearing opening and the second bearing opening; and
two bearing pins, a first bearing pin and a second bearing pin are provided, wherein the first bearing pin is inserted in the first bearing opening or in the second bearing opening, and wherein a second bearing pin is inserted in the first bearing hole or in the second bearing hole, wherein the two bearing pins are fixed relative to the housing.

5. The locking unit as claimed in claim 4, further comprising a rotary latch pivotably supported on the first bearing pin.

6. The locking unit as claimed in claim 4, further comprising a catch detent pivotably supported on the second bearing pin.

7. The locking unit as claimed in claim 6, wherein the catch detent has at least two securing holes for securing an actuation means.

8. The locking unit as claimed in claim 6, further comprising a rotary latch pivotably supported on the first bearing pin wherein the catch detent has a catch face and the rotary latch has an operating face which, regardless of the position of the first bearing pin in the bearing openings, moves in the event of a crash into abutment with the operating face of the rotary latch.

9. The locking unit as claimed in claim 4, further comprising a clamping element pivotably supported on the second bearing pin.

10. The locking unit as claimed in claim 9, further comprising a rotary latch pivotably supported on the first bearing pin wherein the clamping element has a clamping face and the rotary latch has an operating face, wherein the clamping element with the clamping face thereof, regardless of a position of the first bearing pin in the bearing openings, when the locking unit is locked, is always in non-self-locking contact with the operating face of the rotary latch.

11. The locking unit as claimed in claim 9, further comprising a spring wherein the clamping element has at least two suspension holes for securing the spring.

12. The locking unit as claimed in claim 11, wherein an actuation force or a clamping force of the locking unit can be adjusted by securing the spring in the corresponding suspension hole.

13. A locking unit for a vehicle seat, the locking unit comprising:
a housing comprising a first bearing through hole and a second bearing through hole, said second bearing through hole being located at a spaced location from said first bearing through hole, said first bearing through hole defining a range of positions from a first bearing pin extreme first position to a first bearing pin extreme second position, said second bearing through hole defining a single bearing pin position;
a first bearing pin; and
a second bearing pin, at least a portion of said second bearing pin being arranged in said second bearing through hole, whereby said housing is adapted to connect with different hole interval dimensions of a vehicle seat by inserting said bearing pin in different positions of said range of position in said first bearing through hole.

14. The locking unit as claimed in claim 13, wherein said first bearing through hole comprises an elongated hole.

15. The locking unit as claimed in claim 14, wherein:
said housing comprises a side plate and a cover plate, said side plate comprising a first side plate bearing through hole, said cover plate comprising a first cover plate bearing through hole having an elongated hole, said first bearing through hole comprising said first side plate bearing through hole and said first cover plate bearing through hole.

16. The locking unit as claimed in claim 15, wherein said side plate further comprises a second side plate bearing through hole having a circular cross-section, said cover plate comprising a second cover plate bearing through hole having a circular cross-section, said first cover plate bearing through hole being located at a spaced location from said second cover plate bearing through hole, said first side plate bearing through hole being located at a spaced location from said second side plate bearing through hole, said second bearing through hole comprising said second side plate bearing through hole and said second cover plate bearing through hole.

17. The locking unit as claimed in claim 13, wherein:
said housing comprises a side plate with a side plate bearing through hole and said housing further comprises a cover plate with a cover plate bearing through hole, said first bearing through hole comprising said side plate bearing through hole and said cover plate bearing through hole opening; and
one of said first bearing pin and said second bearing pin is inserted in said side plate bearing through hole and said cover plate bearing through hole.

18. The locking unit as claimed in claim 13, further comprising a rotary latch pivotably supported on said first bearing pin.

19. The locking unit as claimed in claim 13, further comprising a catch detent pivotably supported on said second bearing pin.

* * * * *